Patented June 20, 1939

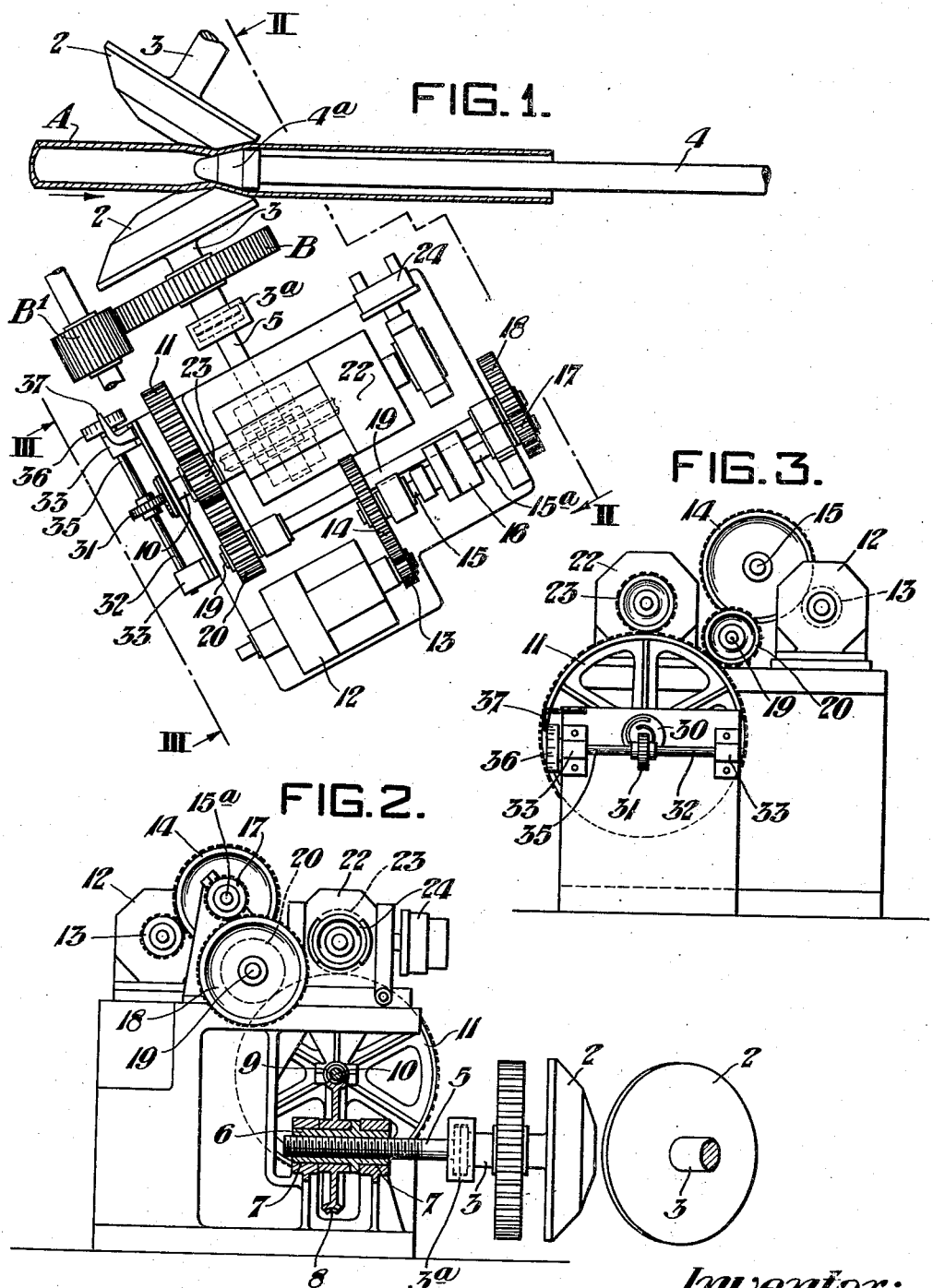

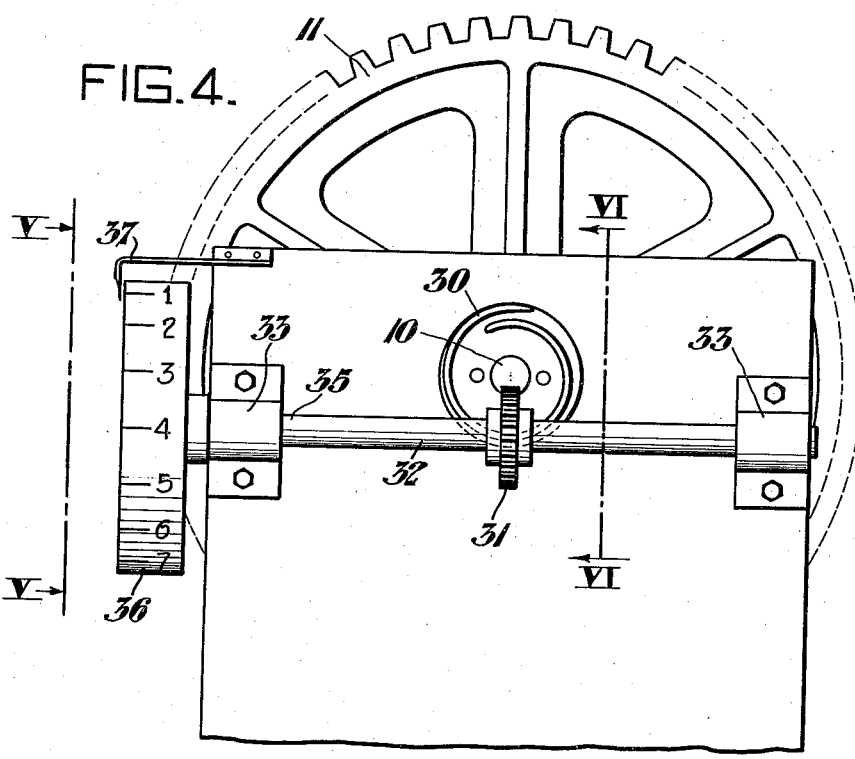
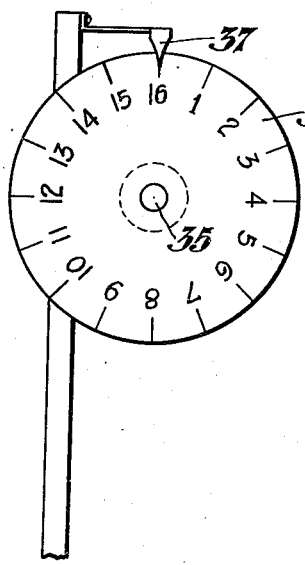
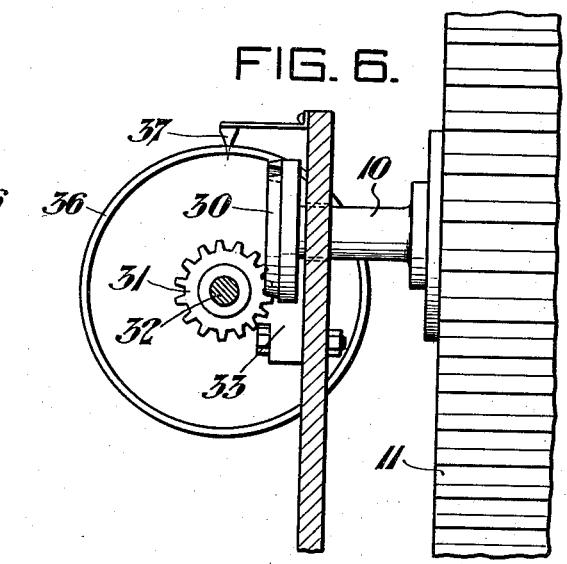

2,163,196

UNITED STATES PATENT OFFICE 2,163,196

INDICATOR

Stevenson Findlater, McKeesport, Pa., assignor to National Tube Company, a corporation of New Jersey Application September 27, 1937, Serial No. 165,970

1 Claim. (Cl. 80—56)

This invention relates to improvements in indicators for metal working roll adjusting mechanism and, while not limited thereto, is particularly adapted for indicating the adjustment of the metal working rolls of pipe or tube mills.

In the manufacture of pipe or tubing by the axial rolling process considerable difficulty has been experienced in properly adjusting or spacing the metal working rolls. Heretofore it has been necessary to actually measure the distance the rolls are spaced apart in order to accurately determine this distance. This is particularly difficult in view of the fact that in the existing type of mills the metal working rolls are completely enclosed except at the inlet and outlet pass. Furthermore, in the type of mills wherein the rolls are spaced further apart during the passage of the work-piece therethrough, to compensate for their expansion due to the heat of the work-piece, it is necessary to reposition the working rolls. While this may be done automatically, it is necessary that the spacing be frequently checked in order to eliminate off-gauge product.

In accordance with the teachings of the present invention, I have provided an indicator on the roll withdrawing and repositioning means of the metal working roll which gives at all times an accurate and positive reading of the relative position of the reciprocable metal working roll with respect to the other metal working roll and the mandrel plug, regardless of whether a work-piece is being acted upon thereby. This indicator of my invention is shown as applied to the automatic roll positioning device of my Patent No. 2,084,330, issued June 22, 1937, for "Seamless pipe or tube mill", but it is to be understood that it may, with equal efficiency, be applied to any metal working roll adjusting mechanism.

It is readily apparent that an accurate gauge for indicating the space between the metal working rolls will materially lessen the amount of off-gauge product produced. Furthermore, it provides a more accurate adjustment than was heretofore obtainable, and relieves the operator of the labor or skill formerly required to determine the spacing between the rolls and the mandrel.

It is accordingly an object of the present invention to provide a positive and accurate indicator for determining the spacing between the metal work rolls and mandrel of a pipe or tube mill.

It is a further object of the present invention to provide an indicator for determining the relative position of the rolls and mandrel of a pipe or tube mill in combination with an automatic roll positioning device.

A still further object is to provide a novel construction of the class described which can be installed on existing mills with but little modification and expense.

The foregoing and further objects will be apparent after referring to the drawings, in which:

Figure 1 is a plan showing a form of apparatus to which the device of my invention can readily be applied.

Figure 2 is a view taken on the line II—II of Figure 1, and showing part of the apparatus in section.

Figure 3 is an end view taken on the line III—III of Figure 1.

Figure 4 is an enlarged elevation of a part of the showing of Figure 3, illustrating the indicator per se.

Figure 5 is an elevation on the line V—V of Figure 4.

Figure 6 is a sectional elevation on the line VI—VI of Figure 4.

Referring more particularly to the drawings, the numeral 2 designates a pair of metal working rolls which are shown as being of the disk-type, but might well be of any of the well known constructions. Ordinarily, in tube practice both of the rolls 2 will be power actuated, but it is to be understood that one of the same may be idle, and it is even within the scope of the invention to apply the principles thereof to any metal working mill employing a plurality of rolls which may be modified as to their relative positions, either in combination or otherwise.

Each of the rolls 2 is mounted on a shaft 3 and driven through suitable mechanism, such as a gear band pinion $B^1$, the latter having an elongated surface to permit relative longitudinal movement of the gear B and shaft 3 on which it is mounted with respect to the pinion $B^1$.

A mandrel bar 4 is disposed in the longitudinal direction of feed of a work-piece or tube A and provided, on one of its ends, with a mandrel plug $4^a$ which is adapted to internally support the work-piece while it is being processed by the rolls 2.

A suitable coupling $3^a$ is provided for connecting one of the roll-shafts 3 to the screw 5 in such manner as to permit independent rotation of the roll-shaft. The screw 5 is disposed in a nut 6 which is journaled for rotation in suitable bearings 7. A worm-wheel 8 is keyed to the nut 6 for rotation therewith and is in mesh with a worm 9, which is mounted on a shaft 10 of a large gear 11.

A motor 12 is positioned somewhat adjacent the large gear 11 and has a pinion 13 associated therewith for rotating a gear 14 which is mounted on a shaft 15.

The shaft 15 carries one member of a magnetic clutch, generally indicated at 16, while a cooperating shaft 15ª carries the cooperating clutch member. A pinion 17 is mounted on the shaft 15ª and in mesh with a gear 18, which is mounted on one end of a shaft 19. The shaft 19 is provided at its other end with a pinion 20 which is in constant mesh with the large gear 11.

A second motor 22 is positioned somewhat closer to the large gear 11 and is provided with a pinion 23 which is in constant mesh therewith. A suitable magnetic brake, generally indicated at 24, is provided for the motor 22.

The rotation of the motor 12 is automatically compensated for differences in resistance to metal displacement caused by introducing metal of varying temperatures into the rolls. The operation is such that the variation in temperature of the work-piece being processed, as measured by photo-electric optical radiation or other pyrometer, will be transmitted to the compensator motor 12 in such manner as to increase or retard the rotation thereof, thereby varying the rate at which the compensator operates. The motor 22 is suitably actuated to return the adjusted roll to its initial position after the work-piece has been processed. The mode of operation of the motors 12 and 22 and their associated instrumentalities is the subject-matter of my aforesaid Patent No. 2,084,330 and forms no part of the present invention.

Rigidly mounted on the shaft 10 is a spiral cam 30 in mesh with a gear 31 rigidly mounted on a shaft 32. This shaft 32 is revolvably mounted in bearings 33 suitably mounted on the frame-work of the mill. Secured to the end 35 of the shaft 32 is a dial member 36. This is calibrated to give a direct reading of the distance the rolls 2 are spaced apart, as can be readily done by determining the longitudinal movement imparted to the rolls 2 through shafts 3 and 5 by one revolution of the gear-wheel 11. Since each revolution of the gear-wheel 11 will turn the shaft 32 a distance equal to the space between the teeth of the gear 31, it is apparent that the calibration of the dial can be made to show direct readings in inches or any unit of distance determined upon, of the spacing between the rolls 2. An indicator member such as that shown at 37 may be provided to enable the operator to more easily take readings. By placing the dial 36 in view of the operator on the control platform he can at all times and without any difficulty whatsoever see whether the rolls 2 are properly spaced.

While I have shown and described a specific embodiment of my invention it will be understood that I do not wish to be limited thereto as various modifications can be made within the scope of the following claim.

I claim:

Apparatus for manufacturing metallic tubular articles comprising a pair of convergent drive-shafts, a housing for carrying each of said drive-shafts, a substantially conical metal working roll secured to the convergent end of each of said drive-shafts, one of said drive-shafts being axially reciprocable with respect to its housing, a shaft axially aligned with and connected to the divergent end of said last named drive-shaft, a gear train associated with said axially aligned shaft, said gear train being constructed and arranged to move said axially aligned shaft whereby the drive-shaft to which it is connected is axially moved to adjust the position of the roll carried thereby, a spiral cam mounted on one of the gears of said gear train, a gear in mesh with said spiral cam, and a dial operated by said gear.

STEVENSON FINDLATER.